US011973921B2

(12) United States Patent
Oko

(10) Patent No.: US 11,973,921 B2
(45) Date of Patent: Apr. 30, 2024

(54) IMAGE PROCESSING APPARATUS

(71) Applicant: SUBARU CORPORATION, Tokyo (JP)

(72) Inventor: Akitaka Oko, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 113 days.

(21) Appl. No.: 17/322,093

(22) Filed: May 17, 2021

(65) Prior Publication Data

US 2021/0368151 A1 Nov. 25, 2021

(30) Foreign Application Priority Data

May 21, 2020 (JP) .................................. 2020-089002

(51) Int. Cl.
*H04N 13/106* (2018.01)
*G06T 5/00* (2006.01)
*G06T 5/50* (2006.01)
*G06T 7/246* (2017.01)
*G06T 7/285* (2017.01)

(52) U.S. Cl.
CPC ........... *H04N 13/106* (2018.05); *G06T 5/006* (2013.01); *G06T 5/50* (2013.01); *G06T 7/246* (2017.01); *G06T 7/285* (2017.01); *G06T 2207/10028* (2013.01)

(58) Field of Classification Search
None
See application file for complete search history.

(56) References Cited

U.S. PATENT DOCUMENTS

| 2012/0206597 | A1  | 8/2012 | Komoto et al. |
|---|---|---|---|
| 2012/0224069 | A1* | 9/2012 | Aoki ................... G01B 11/026 348/E17.002 |
| 2012/0236125 | A1* | 9/2012 | Umezawa ............ G01B 11/026 348/47 |
| 2018/0165833 | A1* | 6/2018 | Inoue .................... H04N 17/002 |

FOREIGN PATENT DOCUMENTS

WO 2012/014430 A1 2/2012

* cited by examiner

*Primary Examiner* — Xiaolan Xu
(74) *Attorney, Agent, or Firm* — TROUTMAN PEPPER HAMILTON SANDERS LLP

(57) ABSTRACT

An image processing apparatus includes a corresponding point calculator and a determination unit. The corresponding point calculator identifies corresponding points relating to an object based on left and right images in each stereo image. The corresponding points include a right image point in the right image and a left image point in the left image. The determination unit predicts a first position of the left image point in a second stereo image, and a second position of the right image point in a second stereo image, based on a position of the left image point in a first stereo image and a position of the right image point in the first stereo image, and determines whether the object is a mobile body based on a difference between the first position predicted and the first position identified, and a difference between the second position predicted and the second position identified.

12 Claims, 9 Drawing Sheets

IMAGE PROCESSING APPARATUS

CROSS-REFERENCE TO RELATED APPLICATIONS

The present application claims priority from Japanese Patent Application No. 2020-089002 filed on May 21, 2020 the entire contents of which are hereby incorporated by reference.

BACKGROUND

The disclosure relates to an image processing apparatus that determines whether an object appearing in a captured image is a mobile body on the basis of a stereo image.

A captured image often includes images of a static object and a mobile body. For example, International Publication No. WO 2012/014430 discloses an apparatus that detects a mobile body on the basis of a moving image.

SUMMARY

An aspect of the disclosure provides an image processing apparatus including a corresponding point calculator and a determination unit. The corresponding point calculator is configured to identify corresponding points relating to an object on the basis of a left image and a right image included in each of a plurality of stereo images. The corresponding points includes a left image point in the left image and a right image point in the right image. The left image point and the right image point are correlated with each other. The plurality of stereo images include a first stereo image and a second stereo image subsequent to the first stereo image. The determination unit is configured to predict a first position and a second position in the second stereo image on the basis of a position of the left image point in the left image of the first stereo image and a position of the right image point in the right image of the first stereo image, and determine whether the object is a mobile body on the basis of a difference between the first position predicted and the first position identified by the corresponding point calculator, and a difference between the second position predicted and the second position identified by the corresponding point calculator. The first position is a position of the left image point in the left image of the second stereo image, and the second position is a position of the right image point in the right image of the second stereo image.

An aspect of the disclosure provides an image processing apparatus including circuitry configured to identify corresponding points relating to an object on the basis of a left image and a right image included in each of a plurality of stereo images. The corresponding points includes a left image point in the left image and a right image point in the right image. The left image point and the right image point are correlated with each other. The plurality of stereo images include a first stereo image and a second stereo image subsequent to the first stereo image. The circuitry is further configured to predict a first position and a second position in the second stereo image on the basis of a position of the left image point in the left image of the first stereo image and a position of the right image point in the right image of the first stereo image, and determine whether the object is a mobile body on the basis of a difference between the first position predicted and the first position identified, and a difference between the second position predicted and the second position identified. The first position is a position of the left image point in the left image of the second stereo image, and the second position is a position of the right image point in the right image of the second stereo image.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

It has been desired to provide an image processing apparatus that determines whether an object appearing in a captured image is a mobile body.

It is desirable to provide an image processing apparatus that makes it possible to determine whether an object appearing in a captured image is a mobile body.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
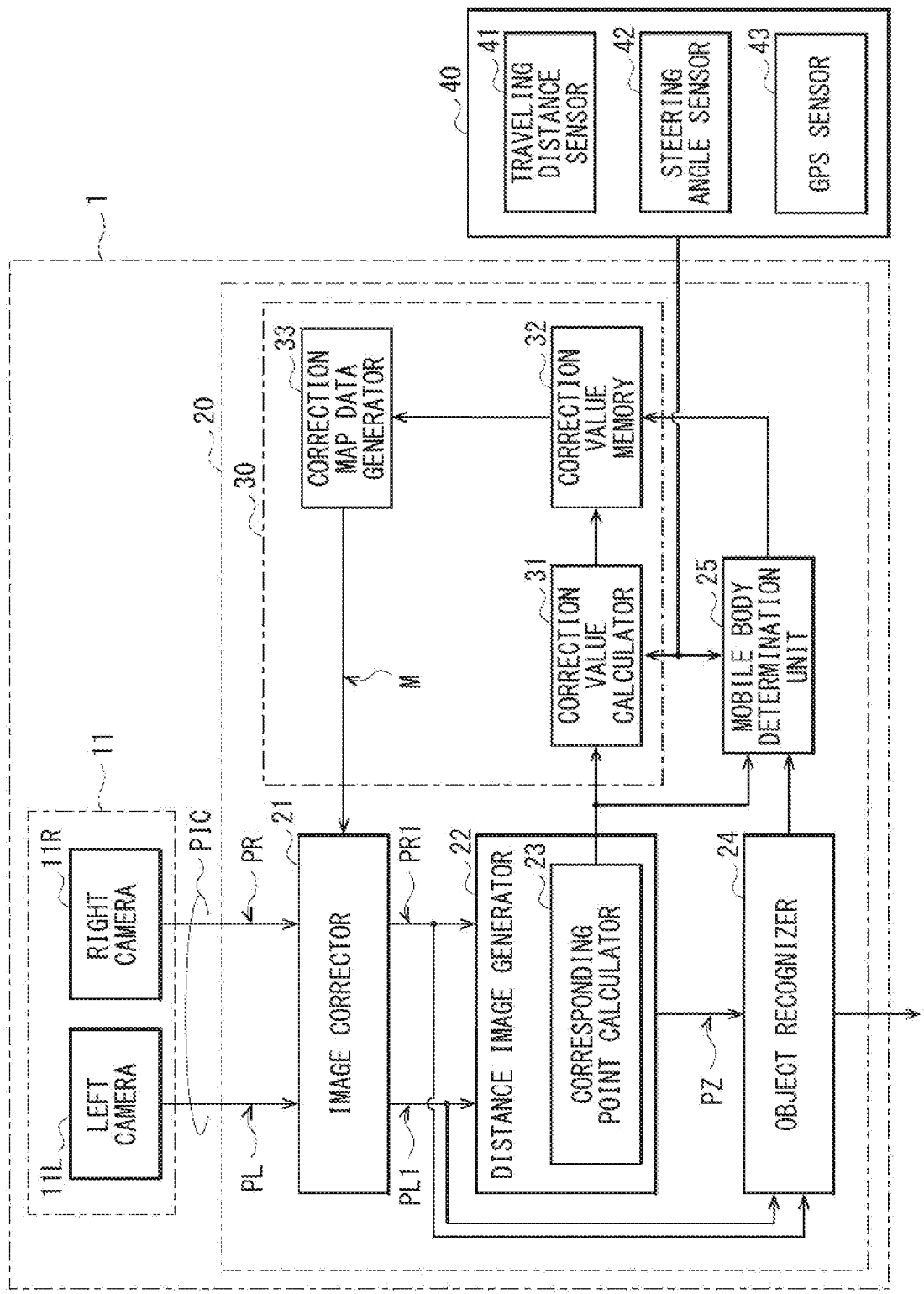
FIG. 1 is a block diagram illustrating an exemplary configuration of an image processing apparatus according to one example embodiment of the disclosure.

FIG. 1 illustrates an image processing apparatus 1 according to an example embodiment of the technology. The image processing apparatus 1 may include a stereo camera 11 and a processor 20. The image processing apparatus 1 may be mounted on a vehicle 10, which may be an automobile, for example.

The stereo camera 11 may capture paired images of an environment in front of the vehicle 10 with respective parallaxes. For example, the stereo camera 11 may include a left camera 11L and a right camera 11R that respectively generate a left image PL and a right image PR having respective parallaxes. The left camera 11L and the right camera 11R may include respective lenses and image sensors.

Figure 2:
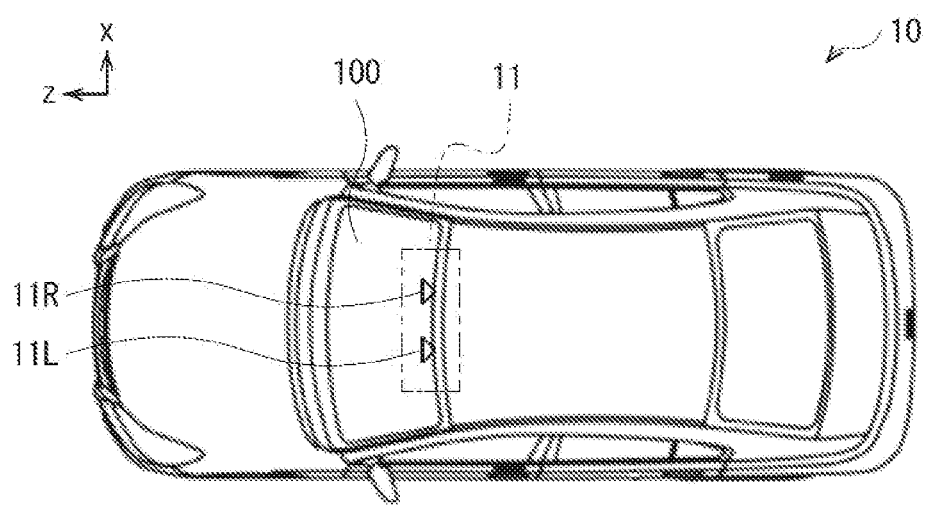
FIG. 2 is an explanatory diagram illustrating an exemplary arrangement of a stereo camera in the image processing apparatus of FIG. 1 on a vehicle.

FIG. 2 illustrates an exemplary arrangement of the stereo camera 11 on the vehicle 10. In this example, the left camera 11L and the right camera 11R may be disposed on an upper interior portion of the front windshield of the vehicle 10 at a predetermined distance therebetween in the width direction of the vehicle 10. The left camera 11L and the right camera 11R may perform an imaging operation in synchronization with each other. The left camera 11L may generate the left image PL, and the right camera 11R may generate the right image PR, as described above. The left image PL may include a plurality of pixel values, and the right image PR may include a plurality of pixel values. The left image PL and the right image PR may constitute a stereo image PIC.

Figure 3:
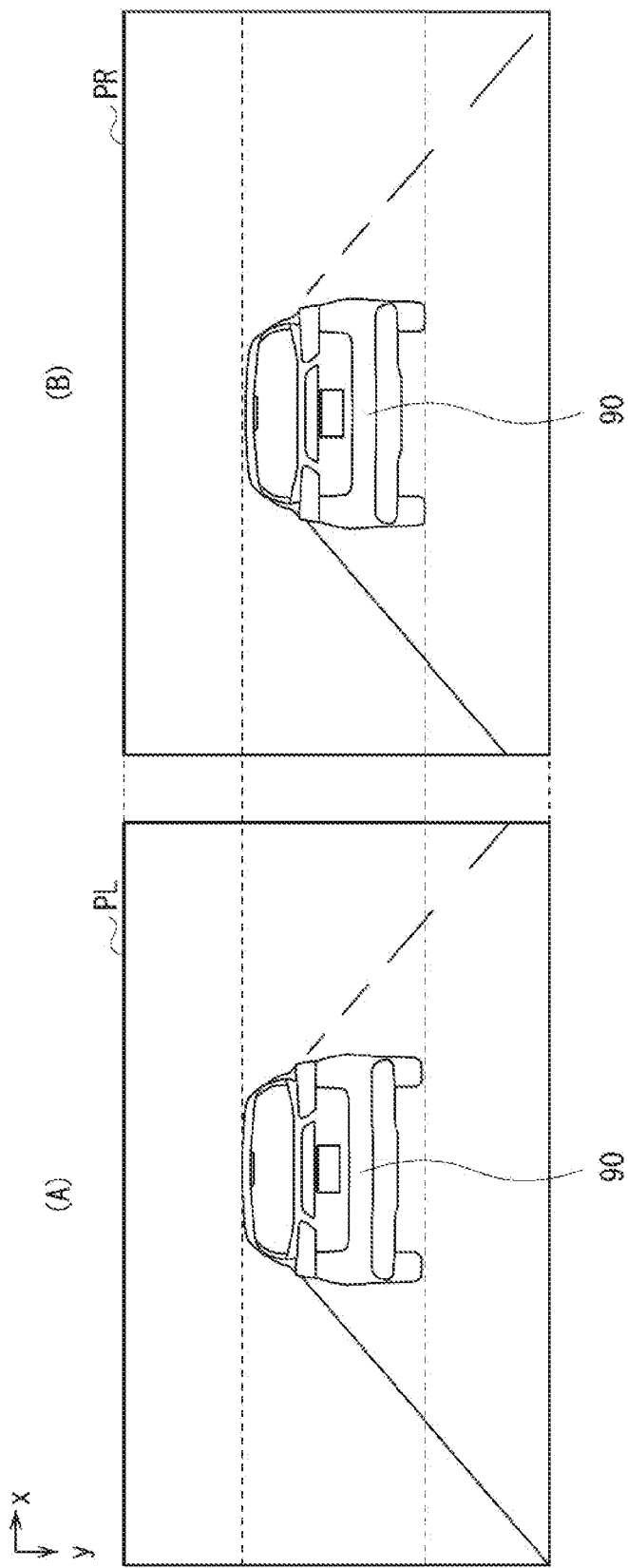
FIG. 3 is an explanatory diagram illustrating examples of left and right images generated by the stereo camera in the image processing apparatus of FIG. 1.

FIG. 3 illustrates an example of the stereo image PIC. Part (A) of FIG. 3 illustrates an example of the left image PL, and Part (B) of FIG. 3 illustrates an example of the right image PR. In this example, another vehicle (e.g., a preceding vehicle 90) is traveling in front of the vehicle 10 on the same traveling road. The left camera 11L may capture an image of the preceding vehicle 90 to generate the left image PL. The right camera 11R may capture an image of the preceding vehicle 90 to generate the right image PR.

The stereo camera 11 may perform the imaging operation at a predetermined frame rate, such as 60 fps, to generate a series of stereo images PIC.

The processor 20 illustrated in FIG. 1 may recognize an object present in front of the vehicle 10 on the basis of the stereo images PIC received from the stereo camera 11. For example, the travel of the vehicle 10 may be controlled on the basis of the information on the object recognized by the processor 20. The information on the object may be displayed on a console monitor of the vehicle 10, for example. The processor 20 may include a central processing unit (CPU) that executes programs, a random access memory (RAM) that temporarily store processing data, and a read only memory (ROM) that stores programs, for example.

The processor 20 may be supplied with information obtained by a sensor 40 mounted on the vehicle 10 via a controller area network (CAN), for example. The sensor 40 may detect a position and orientation of the stereo camera 11. The sensor 40 may include a traveling distance sensor 41, a steering angle sensor 42, and a global positioning system (GPS) sensor 43. The traveling distance sensor 41 may detect a traveling distance of the vehicle 10. For example, the traveling distance sensor 41 may detect a traveling distance of the vehicle 10 from a timing of imaging by the stereo camera 11 to the next imaging timing. The steering angle sensor 42 may detect a steering angle of the vehicle 10. The GPS sensor 43 may receive signals from the GPS satellites to detect a position of the vehicle 10.

The processor 20 may include an image corrector 21, a distance image generator 22, an object recognizer 24, a mobile body determination unit 25, and a correction processing unit 30.

The image corrector 21 may correct the left image PL and the right image PR into a left image PL1 and a right image PR1 on the basis of correction map data M received from the correction processing unit 30. The distance image generator 22 in the processor 20 may perform a stereo matching process on the basis of the left image PL (or the left image PL1) and the right image PR (or the right image PR1) to generate a distance image PZ, which will be described later. In some cases, a parallax difference, which will be described later, can be generated between the left image PL and the right image PR due to low installation accuracy of the left camera 11L and the right camera 11R on the vehicle 10 or distortion of the front windshield 100 of the vehicle 10.

Figure 4:
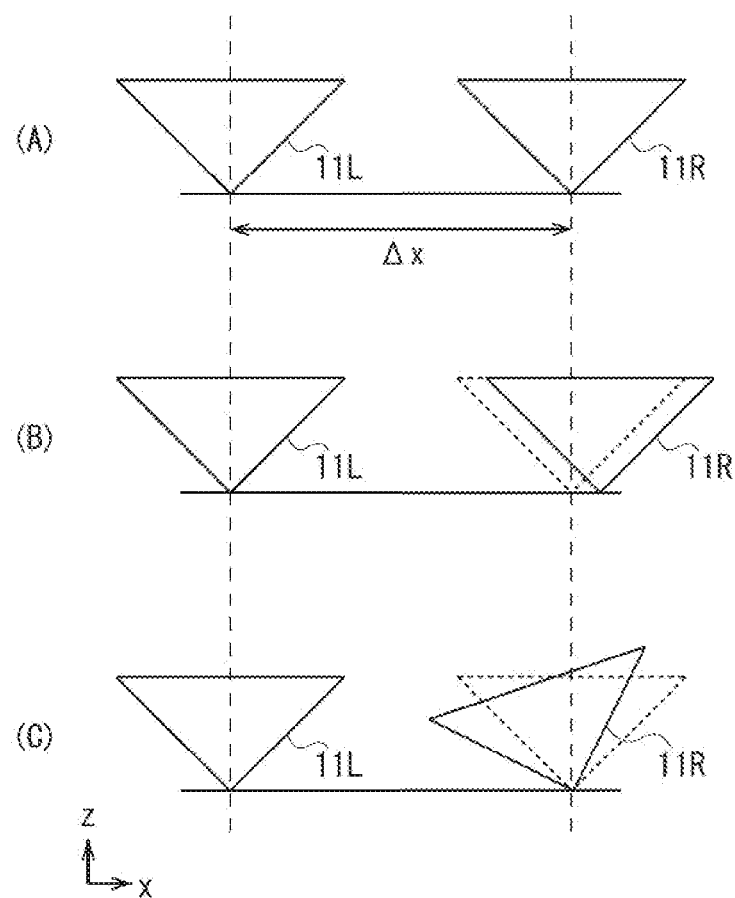
FIG. 4 is an explanatory diagram illustrating an exemplary arrangement of left and right cameras in the image processing apparatus 1 illustrated in FIG. 1.

FIG. 4 schematically illustrates the left camera 11L and the right camera 11R of the stereo camera 11. The left camera 11L and the right camera 11R may be disposed at a predetermined distance ΔX, and may have respective optical axes parallel to each other, as illustrated in Part (A) of FIG. 4. However, as illustrated in Part (B) of FIG. 4, for example, the left camera 11L and the right camera 11R can be disposed at a distance different from the predetermined distance ΔX. Further, as illustrated in Part (C) of FIG. 4, the left camera 11L and the right camera 11R can be disposed such that the optical axes of the left camera 11L and the right camera 11R are not parallel to each other. Even in a case where the left camera 11L and the right camera 11R are disposed as illustrated in Part (A) of FIG. 4, for example, installation positions or orientations of the left camera 11L and the right camera 11R can shift over time to the positions and orientations illustrated in Part (B) or (C) of FIG. 4, for example. The position of an object in the right image PR captured by the stereo camera 11 illustrated in Part (B) or (C) of FIG. 4 may deviate in a lateral (X-) direction from the position of the object in the right image PR captured by the stereo camera 11 illustrated in Part (A) of FIG. 4. The same may apply to the position of the object in the left image PL. As a result, the resultant image generated by the stereo camera 11 can include a parallax difference.

A glass portion of the front windshield 100 in front of the imaging face of the left camera 11L and a glass portion of the front windshield 100 in front of the imaging face of the right camera 11R may have the same optical property. However, in actual cases, these glass portions can have different optical properties. In such cases, the left image PL and the right image PR can distort. Such distortion can shift the left image PL and the right image PR in the lateral (X-) direction, resulting in a parallax difference.

To address such a concern, the image corrector 21 in the image processing apparatus 1 may correct the left image PL and the right image PR on the basis of the correction map data M received from the correction processing unit 30. For example, the image corrector 21 may correct the parallax difference by shifting the pixel values of the left image PL or the pixel values of the right image PR or both in the lateral (X-) direction on the basis of parallax correction values in the correction map data M for the respective pixels. The image corrector 21 may correct the left image PL and the right image PR into the left image PL1 and the right image PR1 in this manner.

On the basis of the left image PL1 and the right image PR1 generated by the image corrector 21, the distance image generator 22 illustrated in FIG. 1 may perform predetermined image processing including a stereo matching process, a filtering process, and other image processes, to generate the distance image PZ. The distance image PZ may include a plurality of pixel values. In this example, each of the pixel values may be a parallax value. In other words, each of the pixel values may correspond to the distance to a point corresponding to each pixel in a three-dimensional real space. Note that this example is a non-limiting example. Alternatively, each of the pixel values may be a value indicative of the distance to a point corresponding to each pixel in the three-dimensional real space, for example.

The distance image generator 22 may include a corresponding point calculator 23. The corresponding point calculator 23 identifies corresponding points CP on the basis of the left image PL1 and the right image PR1. The corresponding points CP may include two image points correlated with each other, namely, a left image point CPL and a right image point CPR. The corresponding point calculator 23 may supply the information on the identified corresponding points CP to the correction processing unit 30 and the mobile body determination unit 25.

The object recognizer 24 may recognize an object OBJ present in front of the vehicle 10 on the basis of the left image PL1, the right image PR1, and the distance image PZ generated by the distance image generator 22. The object recognizer 24 may output data on the result of the recognition.

Further, the object recognizer 24 may identify which of a vehicle, a building, and a person the recognized object OBJ corresponds to. Thereafter, the object recognizer 27 may supply the result of the recognition to the mobile body determination unit 25.

The mobile body determination unit 25 may determine whether the object OBJ is a mobile body on the basis of the information on the corresponding points CP received from the corresponding point calculator 23, the information on the result of recognition received from the object recognizer 24, and the information obtained by the sensor 40. Thereafter, the mobile body determination unit 25 may supply the result of the determination to the correction processing unit 30.

The correction processing unit 30 may generate the correction map data M on the basis of the information on the corresponding points CP identified by the corresponding point calculator 23. The correction processing unit 30 may include a correction value calculator 31, a correction value memory 32, and a correction map data generator 33.

The correction value calculator 31 may calculate the parallax correction values for the pixels of the corresponding points CP on the basis of the information on the corresponding points CP and the information obtained by the sensor 40.

Figure 5:
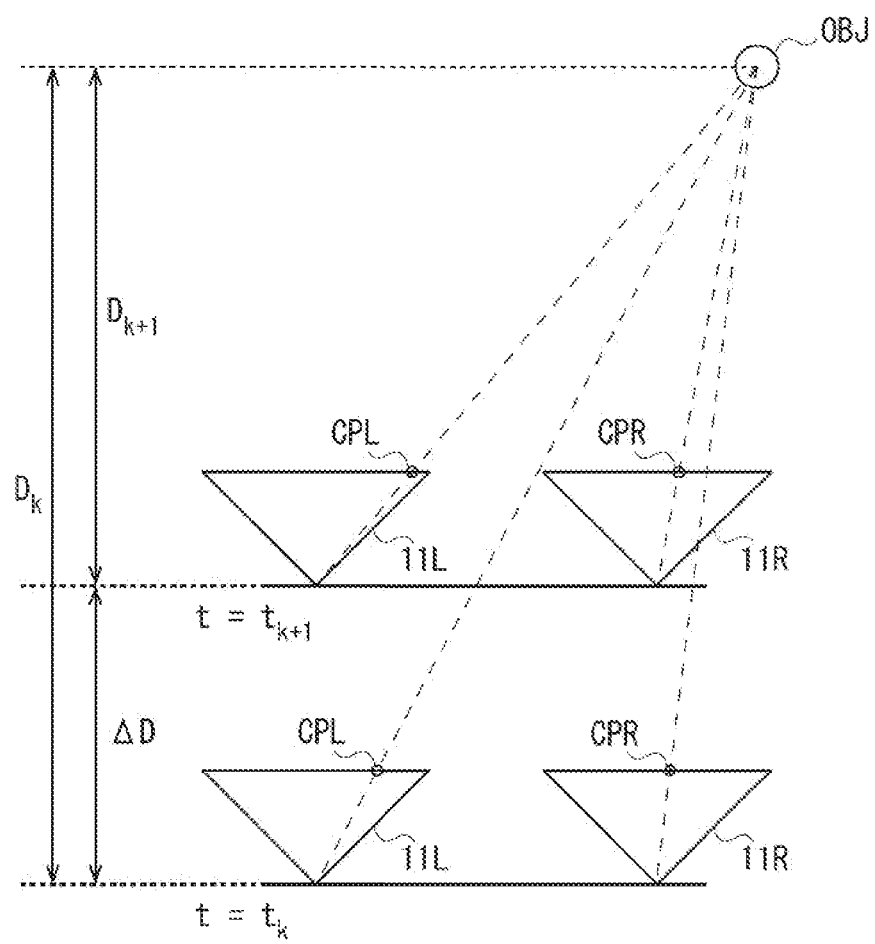
FIG. 5 is an explanatory diagram illustrating an exemplary operation of the image processing apparatus illustrated in FIG. 1.

FIG. 5 illustrates an exemplary operation of the image processing apparatus 1. The distance image generator 22 may identify the corresponding points CP including the left image point CPL and the right image point CPR relating to the object OBJ on the basis of the left image PL1 and the right image PR1 of the stereo image PIC. The correction value calculator 31 may calculate a distance to the object OBJ on the basis of a difference between the position of the left image point CPL in the left image PL1 in the lateral (X−) direction and the position of the right image point CPR in the right image PR1 in the lateral (X−) direction (i.e., the parallax difference). In the example illustrated in FIG. 5, the correction value calculator 31 may calculate a distance $D_k$ to the object OBJ on the basis of the left image point CPL and the right image point CPR at an image timing $t_k$, and then calculate a distance $D_{k+1}$ to the object OBJ on the basis of the left image point CPL and the right image point CPR at the next image timing $t_{k+1}$. Assuming that the object OBJ is a static object, the distance difference $\Delta D$ between the distance $D_{k+1}$ and the distance $D_k$ ($=D_{k+1}-D_k$) is expected to be equal to the traveling distance of the vehicle 10 from the imaging timing $t_k$ to the imaging timing $t_{k+1}$. The traveling distance of the vehicle 10 may be received from the traveling distance sensor 41 in the sensor 40 or the GPS sensor 43. In a case where the distance difference $\Delta D$ is not equal to the traveling distance of the vehicle 10, this may be due to the deviation of the left image PL1 and the right image PR1 in the lateral (X−) direction. Thus, the correction value calculator 31 may calculate the parallax correction values for the pixels of the corresponding points CP so that the distance difference $\Delta D$ becomes equal to the traveling distance of the vehicle 10 obtained by the sensor 40.

The correction value memory 32 may store the parallax correction values calculated by the correction value calculator 31. The parallax correction values may be accumulated correlated with the pixels of the corresponding points CP and the object OBJ. For example, a plurality of parallax correction values may be correlated with each of the pixels when stored. Further, in response to a command from the mobile body determination unit 25, the correction value memory 32 may delete the parallax correction values correlated with the object OBJ determined as a mobile body from the parallax values stored in the correction value memory 32. That is, in response to the command from the mobile body determination unit 25, the correction value memory 32 may retroactively delete the parallax correction values calculated by the correction value calculator 31 and accumulated in the correction value memory 32.

The correction map data generator 33 may generate the correction map data M based on the parallax correction values correlated with the pixels and stored in the correction value memory 32. For example, the correction map data generator 33 may calculate a modal parallax correction value for each of the pixels, and generate the correction map data M based on the modal parallax correction values.

In the image processing apparatus 1 having such a configuration, the correction value calculator 31 may calculate the parallax correction values for the pixels of the corresponding points CP on the basis of the corresponding points CP identified by the corresponding point calculator 23 on the assumption that the object OBJ is a static object, and store the parallax correction values in the correction value memory 32. Thereafter, the correction value memory 32 may delete the parallax correction values correlated with an object determined as a mobile body from the stored parallax values in response to the command from the mobile body determination unit 25. The correction map data generator 33 may generate the correction map data M based on the parallax correction values stored in the correction value memory 32. Accordingly, the image processing apparatus 1 makes it possible to generate the correction map data M on the basis of the corresponding points CP of the object OBJ determined as a static object. This enhances the accuracy in image correction processing by the image corrector 21, and in turn, enhances the accuracy of the distance image PZ generated by the distance image generator 22 in the image processing apparatus 1.

In one embodiment, the image corrector 21 may correspond to an "image corrector". In one embodiment, the distance image generator 22 may correspond to a "distance image generator". In one embodiment, the corresponding point calculator 23 may correspond to a "corresponding point calculator". In one embodiment, the object recognizer 24 may correspond to a "recognizer". In one embodiment, the mobile body determination unit 25 may correspond to a "determination unit". In one embodiment, the correction processing unit 30 may correspond to a "generator". In one embodiment, the left image PL and the left image PL1 may correspond to a "left image". In one embodiment, the right image PR and the right image PR1 may correspond to a "right image". In one embodiment, the left image point CPL may correspond to a "left image point". In one embodiment, the right image point CPR may correspond to a "right image point". In one embodiment, the correction map data M may correspond to "correction map data". In one embodiment, the distance image PZ may correspond to a "distance image".

Exemplary workings and effects of the image processing apparatus 1 according to the example embodiment of the technology will now be described.

First, an outline of an overall operation of the image processing apparatus 1 will now be described with reference to FIG. 1. The stereo camera 11 may capture images of the environment in front of the vehicle 10 to generate the stereo image PIC including the left image PL and the right image PR. The image corrector 21 in the processor 20 may correct the left image PL and the right image PR into the left image PL1 and the right image PR1 on the basis of the correction map data M received from the correction processing unit 30. On the basis of the left image PL1 and the right image PR1, the distance image generator 22 may perform the predetermined image processing including the stereo matching process, the filtering process, and other image processes, to generate the distance image PZ. On the basis of the left image PL1, the right image PR1, and the distance image PZ generated by the distance image generator 22, the object recognizer 24 may recognize an object present in front of the vehicle 10. The mobile body determination unit 25 may determine whether the object is a mobile body on the basis of the information on the corresponding points CP received from the corresponding point calculator 23, the information on the result of recognition received from the object recognizer 24, and the information obtained by the sensor 40. The correction processing unit 30 may generate the correction map data M on the basis of the information on the corresponding points CP identified by the corresponding point calculator 23 in the distance image generator 22. For example, the correction value calculator 31 may calculate the parallax correction values for the pixels of the corresponding points CP on the basis of the information on the corresponding points CP and the information obtained by the sensor 40. The correction value memory 32 may store the parallax correction values calculated by the correction value calculator 31. Further, in response to the command from the mobile body determination unit 25, the correction value memory 32 may delete the parallax correction values correlated with the object OBJ determined as a mobile body from the stored parallax correction values. The correction map data generator 33 may generate the correction map data M based on the parallax correction values correlated with the pixels and stored in the correction value memory 32.

An exemplary operation of the mobile body determination unit 25 will now be described in detail. The mobile body determination unit 25 may determine whether the object OBJ is a mobile body on the basis of the information on the corresponding points CP received from the corresponding point calculator 23, the information on the result of recognition received from the object recognizer 24, and the information obtained by the sensor 40. The determination as to whether the object OBJ is a mobile body may be made through either one of three methods, namely, first, second, and third methods described below.

A first method may involve calculating an essential matrix E on the basis of the information obtained by the sensor 40 and determining whether the object OBJ is a mobile body using the essential matrix E.

Figure 6:
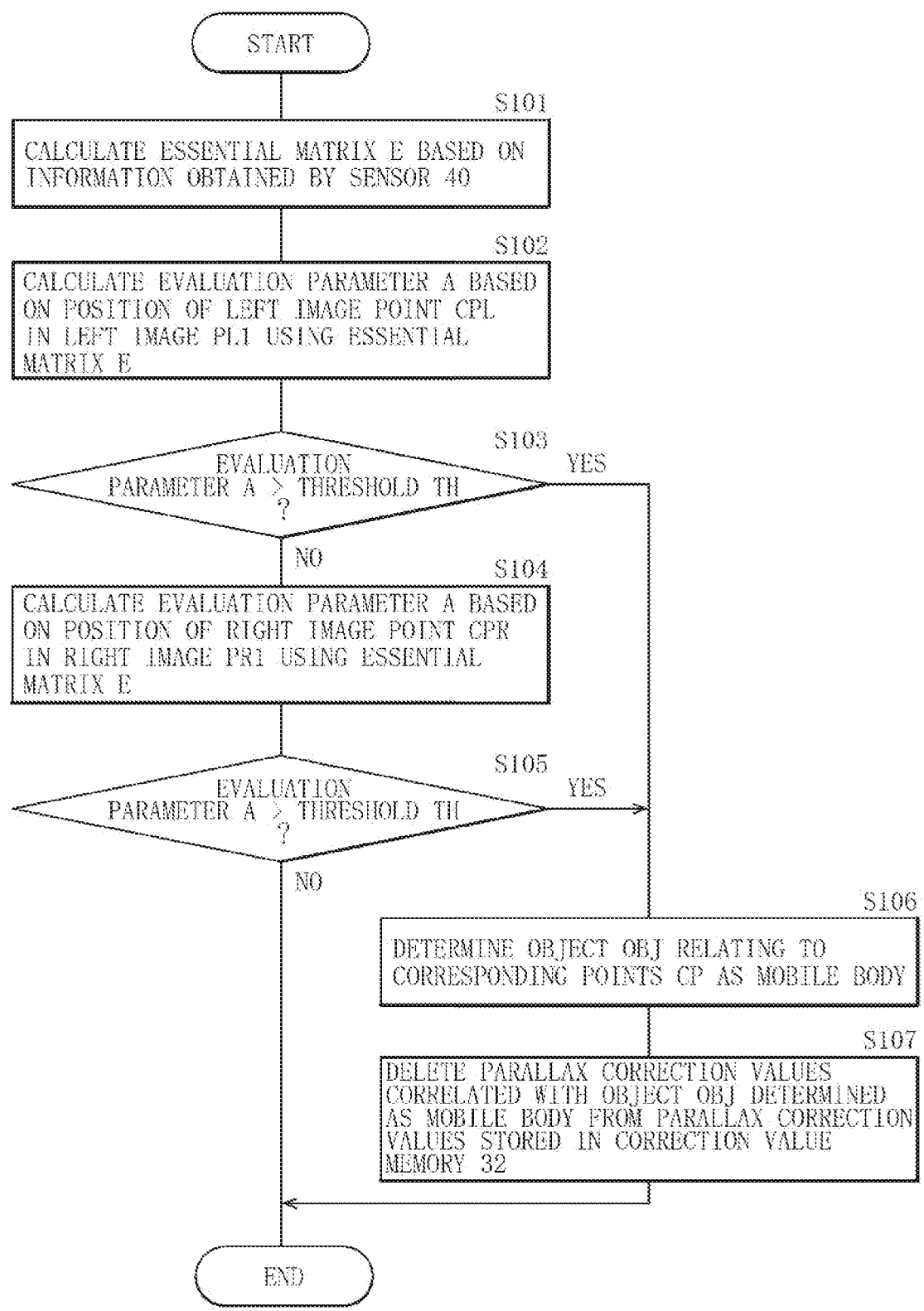
FIG. 6 is a flowchart illustrating an exemplary operation of a mobile body determination unit in the image processing apparatus illustrated in FIG. 1.

An example process of the first method is illustrated in FIG. 6.

First, the mobile body determination unit 25 may calculate the essential matrix E on the basis of the information obtained by the sensor 40 (Step S101).

Next, the mobile body determination unit 25 may calculate an evaluation parameter A on the basis of the position of the left image point CPL in the left image PL1 using the essential matrix E (Step S102).

If the object OBJ is a static object, the position of the left image point CPL in the left image PL1 at the imaging timing $t_k$ and the position of the left image point CPL in the left image PL1 at the next imaging timing $t_{k+1}$ may satisfy the following equation:

$$P_{k+1}{}^T E\, P_k = 0 \qquad \text{Equation Q1}$$

where E denotes a 3×3 essential matrix, $P_k$ denotes a matrix indicative of the position of the left image point CPL in the left image PL1 at the imaging timing $t_k$, and $P_{k+1}{}^T$ denotes a transposed matrix indicative of the position of the left image point CPL in the left image PL1 at the imaging timing $t_{k+1}$.

In contrast, if the object OBJ is a mobile body, Equation EQ1 does not hold. Thus, the mobile body determination unit 25 may determine whether the object OBJ is a mobile body by using the left side of Equation EQ1 as the evaluation parameter A, as in the following equation:

$$A = P_{k+1}{}^T E\, P_k \qquad \text{Equation Q2.}$$

Thereafter, the mobile body determination unit 25 may confirm whether the evaluation parameter A is greater than a predetermined threshold TH (Step S103). If the evaluation parameter A is greater than the predetermined threshold TH (Step S103: YES), the mobile body determination unit 25 may determine that the object OBJ relating to the corresponding point CP or the left image point CPL is a mobile body (Step S106). Thereafter, in response to the command from the mobile body determination unit 25, the correction value memory 32 may delete the parallax correction values correlated with the object OBJ determined as a mobile body from the stored parallax correction values (Step S107). The process of the first method may be thereby completed.

In contrast, if the evaluation parameter A is not greater than the predetermined threshold TH (Step S103: NO), the mobile body determination unit 25 may calculate the evaluation parameter A on the basis of the position of the right image point CPR in the right image PR1 using the essential matrix E, as in Step S102 (Step S104). Thereafter, the mobile body determination unit 25 may confirm the evaluation parameter A is greater than the predetermined threshold TH (Step S105). If the evaluation parameter A is greater than the predetermined threshold TH (Step S105: YES), the mobile body determination unit 25 may determine that the object OBJ relating to the corresponding points CP or the right image point CPR is a mobile body (Step S106). Thereafter, in response to the command from the mobile body determination unit 25, the correction value memory 32 may delete the parallax correction values correlated with the object OBJ determined as a mobile body from the stored parallax correction values (Step S107). The process of the first method may be thereby completed.

If the evaluation parameter A is not greater than the predetermined threshold TH (Step S105: NO), the process of the first method may end.

The second method may involve recognizing the object OBJ and determining whether the object OBJ is a mobile body on the basis of the result of recognition.

Figure 7:
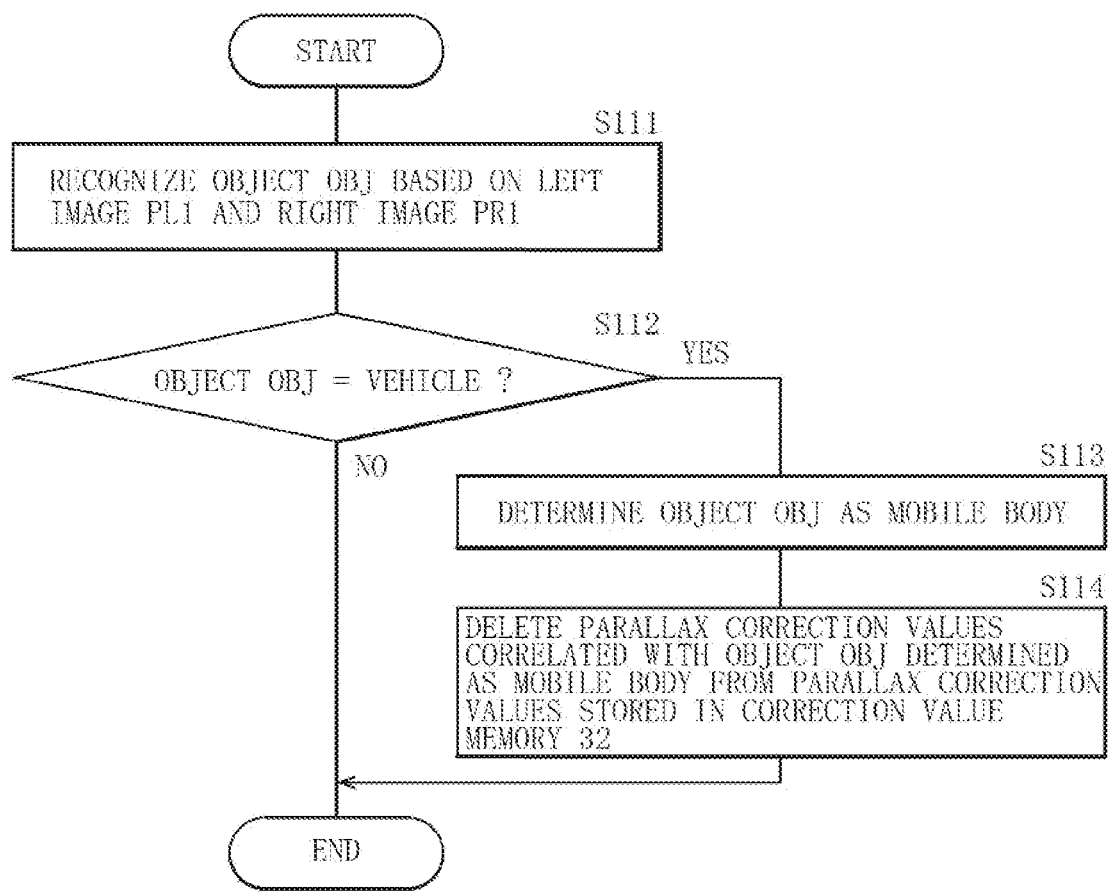
FIG. 7 is a flowchart illustrating another exemplary operation of the mobile body determination unit in the image processing apparatus illustrated in FIG. 1.

An example process of the second method is illustrated in FIG. 7.

First, the object recognizer 24 may identify the object OBJ on the basis of the left image PL1 and the right image PR1 (Step S111). For example, the object recognizer 24 may identify which of a vehicle, a building, and a person the object OBJ corresponds to.

If the object OBJ is a vehicle (Step S112: YES), the mobile body determination unit 25 may determine that the object OBJ is a mobile body (Step S113). That is, if the object OBJ is a vehicle, the mobile body determination unit 25 may determine the object OBJ as a mobile body regardless of whether the object OBJ is actually moving or not because vehicles are movable objects. Thereafter, in response to the command from the mobile body determination unit 25 the correction value memory 32 may delete the parallax correction values correlated with the object OBJ determined as a mobile body from the stored parallax correction values (Step S114). The process of the second method may be thereby completed.

If the object OBJ is not a vehicle (Step S112: NO), the process of the second method may end.

In this example, the mobile body determination unit 25 may determine whether the object is a mobile body by determining whether the object is a vehicle. However, this is a non-limiting example. For example, the mobile body determination unit 25 may determine whether the object is a mobile body by determining whether the object is a person or another movable object.

The third method may involve tracking the object OBJ for a long time and determine whether the object OBJ is a mobile body on the basis of: the difference between a predicted position of the left image point CPL in the left image PL1 in the lateral (X-) direction and an actual position of the left image point CPL in the left image PL1 in the lateral (X-) direction; and the difference between a predicted position of the right image point CPR in the right image PR1 in the lateral (X-) direction and an actual position of the right image point CPR in the right image PR1 in the lateral (X-) direction.

Figure 8:
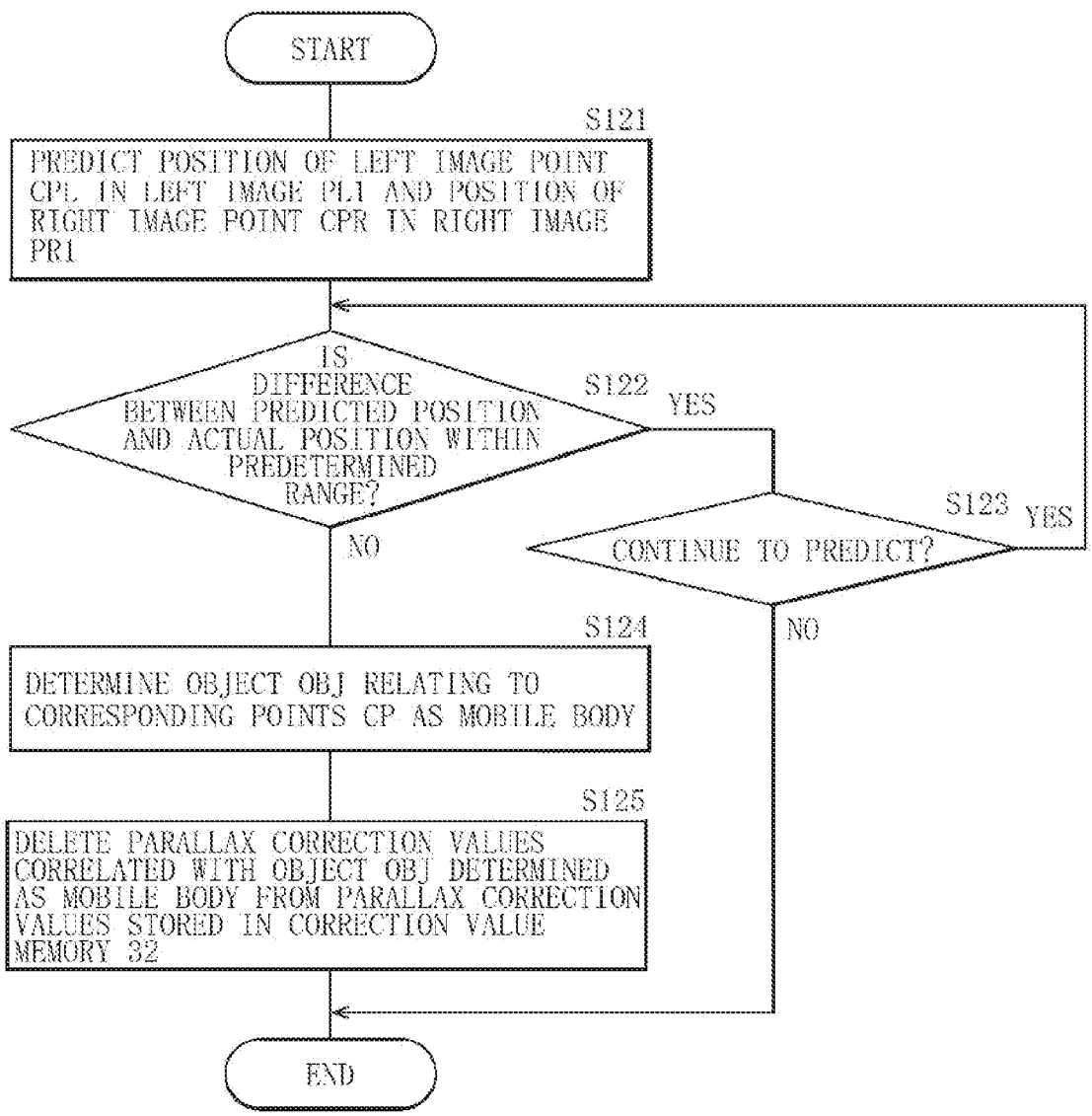
FIG. 8 is a flowchart illustrating still another exemplary operation of the mobile body determination unit in the image processing apparatus 1 illustrated in FIG. 1.

An example process of the third method is illustrated in FIG. 8.

First, the mobile body determination unit 25 may predict a position of the left image point CPL in the left image left image PL1 and a position of the right image point CPR in the right image PR1 (Step S121). For example, the mobile body determination unit 25 may predict a position of the left image point CPL in the left image PL1 and a position of the right image point CPR in the right image PR1 in each future stereo image PIC on the basis of the principle of constraint on epipolar geometry on the assumption that the object OBJ is a static object.

Thereafter, the mobile body determination unit 25 may confirm whether the difference between the predicted position and the actual position is within a predetermined range (Step S122). For example, the mobile body determination unit 25 may monitor the difference between the predicted position of the left image point CPL in the left image PL1 in the lateral direction and the actual position of the left image point CPL in the left image PL1 in the lateral direction and confirm whether the difference is within the predetermined range. Likewise, the mobile body determination unit 25 may monitor the difference between the predicted position of the right image point CPR in the right image PR1 in the lateral direction and the actual position of the right image point CPR in the right image PR1 in the lateral direction and confirm whether the difference is within the predetermined range.

For example, if both of the difference between the predicted position and the actual position of the left image point CPL in the lateral direction and the difference between the predicted position and the actual position of the right image point CPR in the lateral direction are within the predetermined range (Step S122: YES), the mobile body determination unit 25 may determine whether the prediction should continue (Step S123). For example, the mobile body determination unit 25 may determine that the prediction should end when the number of the stereo images PIC having been subjected to the tracking from the start of the prediction in Step S121 becomes greater than a predetermined number. Alternatively, the mobile body determination unit 25 may determine that the prediction should end when the image of the object OBJ disappears from the left image PL1 or the right image PR1, for example. If it is determined that the prediction should continue (Step S123: YES), the process may return to Step S122, and the mobile body determination unit 25 may repeat Steps S122 and S123 until determining that the prediction should end. If it is determined that the prediction should end (Step S123: NO), the process may end.

If at least either one of the difference between the predicted position and the actual position of the left image point CPL in the lateral direction and the difference between the predicted position and the actual position of the right image point CPR in the lateral direction is greater than the predetermined range (Step S122: NO), for example, the mobile body determination unit 25 may determine that the object OBJ relating to the corresponding points CP is a mobile body (Step S124). In a case where the object OBJ is a static object, the predicted position of the left image point CPL obtained on the basis of the principle of constraint on epipolar geometry may be substantially identical to the actual position of the left image point CPL, and the predicted position of the right image point CPR obtained on the basis of the principle of constraint on epipolar geometry may be substantially identical to the actual position of the right image point CPR. However, in a case where the object OBJ is a mobile body, the predicted position of the left image point CPL obtained on the basis of the principle of constraint on epipolar geometry may deviate from the actual position of the left image point CPL, and likewise, the predicted position of the right image point CPR obtained on the basis of the principle of the constraint on epipolar geometry may deviate from the actual position of the right image point CPR. Thus, if at least either one of the difference between the predicted position and the actual position of the left image point CPL and the difference between the predicted position and the actual position of the right image point CPR is greater than the predetermined range, the mobile body determination unit 25 may determine the object OBJ as a mobile body.

Thereafter, in response to the command from the mobile body determination unit 25, the correction value memory 32 may delete the parallax correction values correlated with the object OBJ determined as a mobile body (Step S125). The process may be thereby completed.

Figure 9:
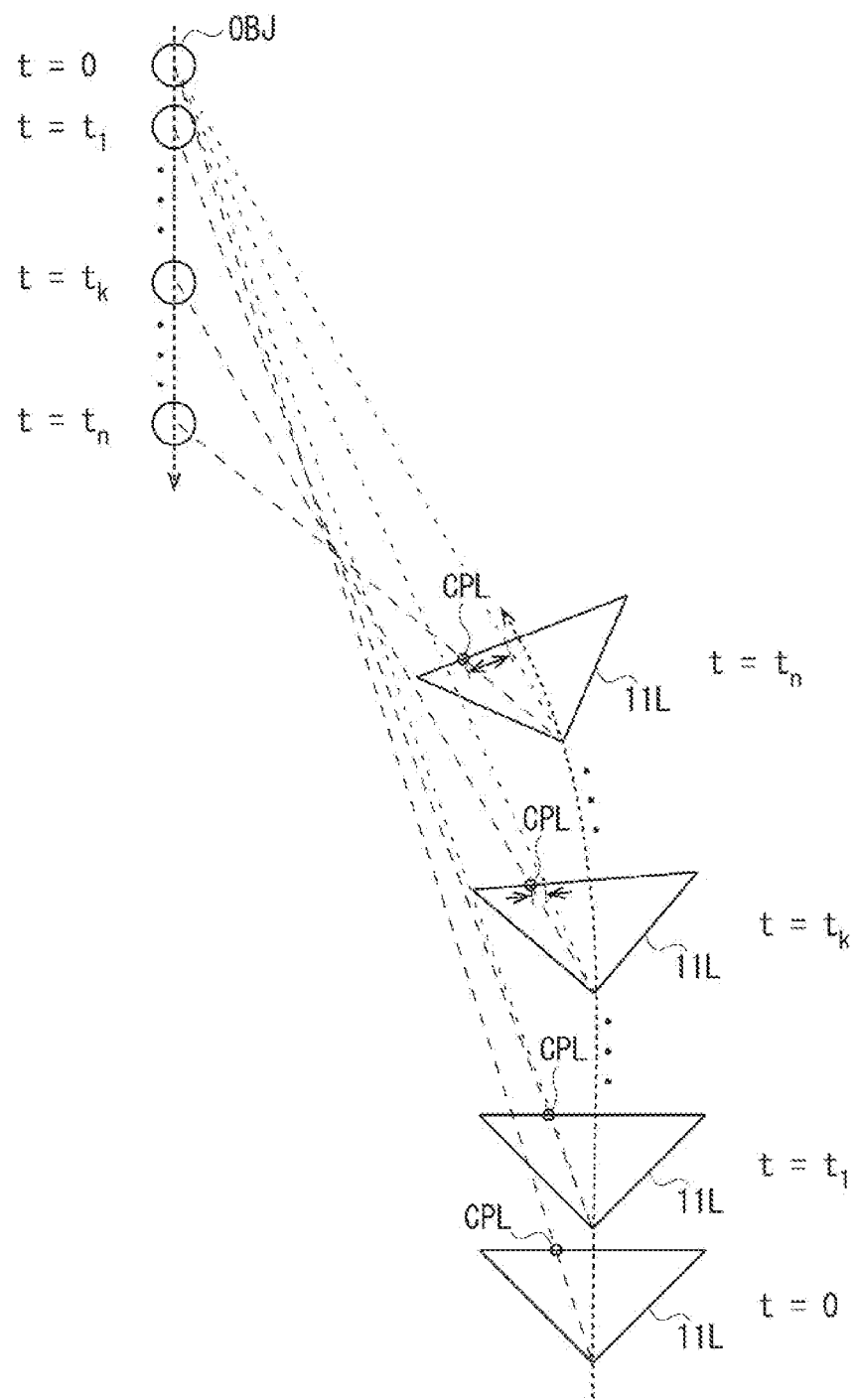
FIG. 9 is an explanatory diagram illustrating yet another exemplary operation of the mobile body determination unit illustrated in FIG. 1.

FIG. 9 illustrates an example of the process based on the third method illustrated in FIG. 8. Note that, in FIG. 9, only the left camera 11L out of the left camera 11L and the right camera 11R is illustrated for convenience of explanation. At an image timing t=0, the corresponding point calculator 23 may obtain the position of the left image point CPL by identifying the corresponding points CP of the object OBJ on the basis of the stereo image PIC. Additionally, at an imaging timing t=0, the mobile body determination unit 25 may start predicting a position of the left image point CPL in the left image PL1 and a position of the right image point CPR in the right image PR1 in a future stereo image PIC.

In a case where the object OBJ is static, the predicted position of the left image point CPL in the left image PL1 is substantially identical to the actual position of the left image point CPL in the left image PL1, and likewise, the predicted position of the right image point CPR in the right image PR1 is substantially identical to the actual position of the right image point CPR in the right image PR1. However, in a case where the object OBJ is moving, the predicted position of the left image point CPL in the left image PL1 may deviate from the actual position of the left image point CPL in the left image PL1 over time, and likewise, the predicted position of the right image point CPR in the right image PR1 may deviate from the actual position of the right image point CPR in the right image PR1 over time, as illustrated by an arrow in FIG. 9. For example, in a case where the distance between the object OBJ and the vehicle 10 is large enough, the difference between the predicted position and the actual position is small even while the object OBJ is moving. However, as the distance between the object OBJ and the vehicle 10 becomes smaller, the difference between the predicted position and the actual position may become larger.

If the difference between the predicted position and the actual position becomes greater than the predetermined range, the mobile body determination unit 25 may determine the object OBJ as a mobile body.

According to the image processing apparatus 1 described above, on the basis of the left image point CPL relating to the object OBJ in the left image PL1 and the right image point CPR relating to the object OBJ in the right image PR1 in a first stereo image PIC, the mobile body determination unit 25 predicts a position of the left image point CPL (a first position) relating to the object OBJ in the left image PL1 and a position of the right image point CPR (a second position) relating to the object OBJ in the right image PR1 in a second stereo image PIC subsequent to the first stereo image PIC, as illustrated in FIG. 8. Then, the mobile body determination unit 25 determines whether the object OBJ is a mobile body on the basis of: the difference between the first position predicted and the first position obtained by the corresponding point calculator 23; and the difference between the second position predicted and the second position obtained by the corresponding point calculator 23. Accordingly, the object OBJ is determined as a mobile body if the difference between the first position predicted by the mobile body determination unit 25 and the first position obtained by the corresponding point calculator 23 in the left image PL1 is greater than the predetermined range or where the difference between the second position predicted by the mobile body determination unit 25 and the second position obtained by the corresponding point calculator 23 in the right image PR1 is greater than the predetermined range.

According to the image processing apparatus 1 described above, the mobile body determination unit 25 may determine whether the object OBJ is a mobile body on the basis of: the position of the left image point CPL relating to the object OBJ in the left image PL1 and the position of the right image point CPR relating to the object OBJ in the right image PR1 in one stereo image PIC; the position of the left image point CPL relating to the object OBJ in the left image PL1 and the position of the right image point CPR relating to the object OBJ in the right image PR1 in another stereo image PIC; and the result of detection by the sensor 40 that detects the position and orientation of the stereo camera 11 that generates multiple stereo images PIC, as illustrated in FIG. 6. Accordingly, the mobile body determination unit 25 makes it possible to calculate the essential matrix E on the basis of the result of detection by the sensor 40, generate the evaluation parameter A on the basis of the position of the left image point CPL in the left image PL1 using the essential matrix E, and determine the object OBJ as a mobile body if the evaluation parameter A is greater than the predetermined threshold TH, for example. Further, the mobile body determination unit 25 may generate the evaluation parameter A on the basis of the right image point CPR in the right image PR1 using the essential matrix E, and determine the object OBJ as a mobile body if the evaluation parameter A is greater than the predetermined threshold TH.

According to the image processing apparatus 1 described above, the object recognizer 24 may make recognition of the object OBJ on the basis of the left image PL1 and the right image PR1, and the mobile body determination unit 25 may determine whether the object OBJ is a mobile body on the basis of the result of the recognition, as illustrated in FIG. 7. For example, the mobile body determination unit 25 may determine the object OBJ as a mobile body if the object OBJ is a vehicle.

According to the image processing apparatus 1 described above, the correction processing unit 30 may generate the parallax correction value on the basis of the information on the corresponding points CP identified by the corresponding point calculator 23 and the result of detection by the sensor 40 that detects the position and orientation of the stereo camera 11 that generates multiple stereo images PIC, accumulate the parallax correction value to obtain a plurality of the parallax correction values, and generate the correction map data M based on the parallax correction values accumulated. The correction processing unit 30 may generate the correction map data M on the basis of one or more parallax correction values out of the accumulated parallax correction values. The one or more parallax correction values excludes the parallax correction values correlated with the object determined as a mobile body by the mobile body determination unit 25. Accordingly, the image processing apparatus 1 may generate the correction map data M based on the corresponding points CP of the object OBJ determined as a static object. This enhances the accuracy in image correction by the image corrector 21.

That is, assuming that the object OBJ is a static object, the correction value calculator 31 in the correction processing unit 30 may calculate the parallax correction values so that the difference in distance to the object OBJ (i.e., the distance difference $\Delta D$) obtained on the basis of two stereo images PIC captured at different imaging timings becomes equal to the traveling distance acquired by the sensor 40. If the object OBJ is a mobile body, the calculated parallax correction values can differ from desired values under an influence of the movement of the object OBJ. Thus, the image processing apparatus 1 may generate the correction map data M on the basis of the calculated parallax correction values excluding the parallax correction values correlated with the object determined as a mobile body by the mobile body determination unit 25. This reduces the influence of the movement of the object OBJ on the image corrector 21. Accordingly, the parallax difference due to low installation accuracy of the left camera 11L and the right camera 11R on the vehicle 10 or distortion of the front windshield 100 is effectively corrected. This enhances the accuracy in image correction by the image corrector 21.

Further, the image processing apparatus 1 may generate the distance image PZ on the basis of the left image PL1 and the right image PR1 generated by the image corrector 21. This facilitates the generation of the distance image PZ with enhanced accuracy.

According to the example embodiment described above, the position of the left image point relating to the object (i.e., the first position) in the left image and the position of the right image point relating to the object (i.e., the second position) in the right image of the second stereo image subsequent to the first stereo image are predicted on the basis of the position of the left image point relating to the object in the left image and the position of the right image point relating to the object in the right image of the first stereo image. Further, it is determined whether the object is a mobile body on the basis of the difference between the first position predicted and the first position obtained by the corresponding point calculator, and the difference between the second position predicted and the second position obtained by the corresponding point calculator. Accordingly, it is possible to effectively determine whether the object is a mobile body.

According to the example embodiment described above, it may be determined whether the object is a mobile body on the basis of the position of the left image point relating to the object in the left image and the position of the right image point relating to the object in the right image of one stereo image, the position of the left image point relating to the object in the left image and the position of the right image point relating to the object in the right image of another stereo image; and the result of detection by the sensor that detects the position and orientation of the stereo camera that generates multiple stereo images. Accordingly, it is possible to effectively determine whether the object is a mobile body.

According to the example embodiment described above, the object may be recognized on the basis of the left image and the right image, and it may be determined whether the object is a mobile body on the basis of the result of the recognition. Accordingly, it is possible to effectively determine whether the object is a mobile body.

According to the example embodiment described above, the parallax correction values are generated on the basis of the information on the corresponding points identified by the corresponding point calculator, and the result of detection by the sensor that detects the position and orientation of the stereo camera that generates multiple stereo images. The generated parallax correction values are accumulated, and the correction map data are generated on the basis of the parallax correction values accumulated. The correction map data are generated on the basis of the accumulated parallax correction values excluding the parallax correction values correlated with the object determined as a mobile body by the mobile body determination unit. This enhances the accuracy in imaging correction by the image corrector. Further, the distance image is generated on the basis of the left image and the right image generated by the image corrector. This facilitates the generation of the distance image with enhanced accuracy.

According to the image processing apparatus according to the example embodiments of the technology, it is possible to determine whether an object is a mobile body.

Some example embodiments of the technology are described in detail above with reference to the accompanying drawings. It should be appreciated that the example embodiments of the technology described above are mere examples and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

In the example embodiment described above, the stereo camera 11 may capture an image of the environment in front of the vehicle 10. However, this is a non-limiting example. Alternatively, the stereo camera 11 may capture an image of an environment on a side or behind the vehicle 10, for example.

It should be appreciated that the effects described herein are mere illustrative and non-limiting, and other effects may be made.

One or more of the corresponding point calculator 23 and the mobile body determination unit 25 in the processor 20 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the corresponding point calculator 23 and the mobile body determination unit 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the corresponding point calculator 23 and the mobile body determination unit 25 in the processor 200 illustrated in FIG. 1.

The invention claimed is:

1. An image processing apparatus comprising:
a corresponding point calculator configured to identify corresponding points relating to an object on a basis of a left image and a right image included in each of a plurality of stereo images, the corresponding points including a left image point in the left image and a right image point in the right image, the left image point and the right image point being correlated with each other, the plurality of stereo images including a first stereo image and a second stereo image subsequent to the first stereo image; and
a determination unit configured to
predict a first position and a second position relating to the object in a future second stereo image on a basis of a position of the left image point in the left image of the first stereo image and a position of the right image point in the right image of the first stereo image under an assumption that the object corresponding to the right and left image points is a static object, the first position being a position of the left image point in the left image of the future second stereo image, the second position being a position of the right image point in the right image of the future second stereo image, and
determine whether the object is a mobile body on a basis of a first difference between the first position predicted in the future second stereo image and the first position in the second stereo image identified by the corresponding point calculator, and a second difference between the second position predicted in the future second stereo image and the second position in the second stereo image identified by the corresponding point calculator, wherein the object is determined as a mobile body in a case where at least one of the first difference and the second difference is greater than a predetermined threshold.

2. The image processing apparatus according to claim 1, further comprising:
an image corrector configured to
perform image correction that shifts positions of pixel values of the left image and the right image on a basis of correction map data, and
supply the left image and the right image to the corresponding point calculator after the image correction; and
a generator configured to
generate a parallax correction value on a basis of information on the corresponding points identified by the corresponding point calculator and a result of detection by a sensor that detects a position and an orientation of a stereo camera that generates the plurality of stereo images,
accumulate the parallax correction value to obtain a plurality of the parallax correction values, and
generate the correction map data on a basis of one or more parallax correction values out of the plurality of the parallax correction values, the one or more parallax correction values excluding parallax correction values correlated with the object determined as a mobile body by the determination unit.

3. The image processing apparatus according to claim 2, wherein
the plurality of stereo images further includes a third stereo image and a fourth stereo image, and
the determination unit is further configured to determine whether the object is a mobile body on a basis of a position of the left image point in the left image of the third stereo image, a position of the right image point in the right image of the third stereo image, a position of the left image point in the left image of the fourth stereo image, a position of the right image point in the right image of the fourth stereo image, and the result of detection by the sensor.

4. The image processing apparatus according to claim 2, further comprising a distance image generator configured to generate a distance image, the distance image generator including the corresponding point calculator.

5. The image processing apparatus according to claim 3, further comprising a distance image generator configured to generate a distance image, the distance image generator including the corresponding point calculator.

6. The image processing apparatus according to claim 1, further comprising:
an image corrector configured to correct the left image or the right image on a basis of a correction map data, wherein the correction map data is generated on a basis of accumulated correction values after deleting a correction value correlated with the object determined as a mobile body by the determination unit from the accumulated correction values.

7. An image processing apparatus comprising:
circuitry configured to
identify corresponding points relating to an object on a basis of a left image and a right image included in each of a plurality of stereo images, the corresponding points including a left image point in the left image and a right image point in the right image, the left image point and the right image point being correlated with each other, the plurality of stereo images including a first stereo image and a second stereo image subsequent to the first stereo image,
predict a first position and a second position relating to the object in a future the second stereo image on a basis of a position of the left image point in the left image of the first stereo image and a position of the right image point in the right image of the first stereo image under an assumption that the object corresponding to the right and left image points is a static object, the first position being a position of the left image point in the left image of the future second stereo image, the second position being a position of the right image point in the right image of the future second stereo image, and
determine whether the object is a mobile body on a basis of a first difference between the first position predicted in the future second stereo image and the first position identified in the second stereo image, and a second difference between the second position predicted in the future second stereo image and the second position identified in the second stereo image, wherein the object is determined as a mobile body in a case where at least one of the first difference and the second difference is greater than a predetermined threshold.

8. The image processing apparatus according to claim 2, further comprising
a recognizer configured to make recognition of the object on a basis of the left image and the right image, wherein
the determination unit is further configured to determine whether the object is a mobile body on a basis of a result of the recognition by the recognizer.

9. The image processing apparatus according to claim 3, further comprising:
a recognizer configured to make recognition of the object on a basis of the left image and the right image, wherein
the determination unit is further configured to determine whether the object is a mobile body on a basis of a result of the recognition by the recognizer.

10. The image processing apparatus according to claim 8, further comprising
a distance image generator configured to generate a distance image, the distance image generator including the corresponding point calculator.

11. The image processing apparatus according to claim 9, further comprising
a distance image generator configured to generate a distance image, the distance image generator including the corresponding point calculator.

12. The image processing apparatus according to claim 7, wherein the circuitry is further configured to:
delete a correction value correlated with the object determined as a mobile body from accumulated correction values;
generate a correction map data on a basis of the accumulated correction values; and
correct the left image or the right image on a basis of the correction map data.

* * * * *